(12) United States Patent
Zhao et al.

(10) Patent No.: US 11,226,520 B2
(45) Date of Patent: Jan. 18, 2022

(54) DISPLAY SUBSTRATE, DISPLAY PANEL AND DISPLAY ASSEMBLY

(71) Applicant: BOE TECHNOLOGY GROUP CO., LTD., Beijing (CN)

(72) Inventors: Detao Zhao, Beijing (CN); Li Xiao, Beijing (CN); Lei Wang, Beijing (CN); Dongni Liu, Beijing (CN); Liang Chen, Beijing (CN); Jifeng Tan, Beijing (CN); Minghua Xuan, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 241 days.

(21) Appl. No.: 16/614,343

(22) PCT Filed: May 15, 2019

(86) PCT No.: PCT/CN2019/087087
§ 371 (c)(1),
(2) Date: Nov. 15, 2019

(87) PCT Pub. No.: WO2020/052261
PCT Pub. Date: Mar. 19, 2020

(65) Prior Publication Data
US 2021/0333654 A1 Oct. 28, 2021

(30) Foreign Application Priority Data

Sep. 14, 2018 (CN) .......................... 201811074327.8

(51) Int. Cl.
*G02F 1/1343* (2006.01)
*F21V 8/00* (2006.01)
(Continued)

(52) U.S. Cl.
CPC ....... *G02F 1/134345* (2021.01); *G02B 6/005* (2013.01); *G02F 1/133512* (2013.01);
(Continued)

(58) Field of Classification Search
None
See application file for complete search history.

(56) References Cited

U.S. PATENT DOCUMENTS

2001/0010575 A1* 8/2001 Yoshida ............ G02F 1/134363
349/141
2008/0007684 A1* 1/2008 Kim .................. G02F 1/133512
349/143
(Continued)

FOREIGN PATENT DOCUMENTS

CN 107238974 A * 10/2017 ....... G02F 1/133615

OTHER PUBLICATIONS

English translation of CN-107238974-A, Title: A Backlight Source And Liquid Crystal Display Module, Author: Meng Xiandong; Date of publication: Oct. 10, 2017 (Year: 2017).*

*Primary Examiner* — Shan Liu
(74) *Attorney, Agent, or Firm* — Syncoda LLC; Feng Ma (57) ABSTRACT

A display substrate includes: a plurality of sub-pixel regions at a first base substrate, each of the plurality of sub-pixel regions including a light-blocking region and aperture regions located at opposing sides of the light-blocking region; and a first transparent electrode and a second transparent electrode within each of the plurality of sub-pixel regions, configured to drive a liquid crystal layer; wherein the first transparent electrode includes a first electrode unit located inside the light-blocking region and including a plurality of first sub-electrodes, wherein each of the plurality of first sub-electrodes are separated from two adjacent first sub-electrodes by a separation distance; and wherein the separation distance between two adjacent first sub-elec-
(Continued)

trodes nearest to a center line of the light-blocking region is smaller than the separation distance between two adjacent first sub-electrodes nearest to an edge of the light-blocking region.

19 Claims, 5 Drawing Sheets

(51) Int. Cl.
*G02F 1/1335* (2006.01)
*G02F 1/139* (2006.01)

(52) U.S. Cl.
CPC .. *G02F 1/133524* (2013.01); *G02F 1/133567* (2021.01); *G02F 1/1393* (2013.01); *G02F 1/13439* (2013.01); *G02F 1/133514* (2013.01); *G02F 1/134363* (2013.01); *G02F 2201/30* (2013.01); *G02F 2203/30* (2013.01)

(56) References Cited

U.S. PATENT DOCUMENTS

| | | | |
|---|---|---|---|
| 2015/0098039 A1* | 4/2015 | Park | G02F 1/134363 349/42 |
| 2019/0204691 A1* | 7/2019 | Tan | G02F 1/13306 |
| 2019/0302548 A1* | 10/2019 | Lee | H01L 27/124 |

\* cited by examiner

DISPLAY SUBSTRATE, DISPLAY PANEL AND DISPLAY ASSEMBLY

CROSS-REFERENCE TO RELATED APPLICATION

The present application claims priority to Chinese Patent Application No. 201811074327.8 filed on Sep. 14, 2018, the disclosure of which is hereby incorporated by reference in its entirety.

TECHNICAL FIELD

The present disclosure relates to the fields of display technologies, and more specifically to a display substrate, a display panel and a display assembly.

BACKGROUND

In plane-field liquid crystal display (LCD) components, light emitted by backlight sources will pass through two polarizer layers, as a result, light transmittance is low and power consumption is high. In order to solve the above technical problems, collimated light sources are adopted in existing technologies, in existing collimated light source display technologies, collimated light is transmitted to a liquid crystal layer through light extraction openings, light-blocking patterns are arranged corresponding to the positions of the light extraction openings.

When no electric field is applied, collimated light at the positions of light extraction openings is blocked by light-blocking patterns, dark state display is therefore realized.

When a driving electric field is applied, liquid crystal molecules are tilted to form liquid crystal prisms, the liquid crystal prisms deflect the collimated light entered. As a result, light will emit from the aperture regions located at two sides of the light-blocking patterns, and bright state display is therefore realized. In addition, displaying in different gray scales can be realized according to the degree of deflection of the light.

As such, polarizers are not needed to polarize light in collimated light display technologies, and light transmittance is high and power consumption is low.

SUMMARY

In a first aspect, a display substrate is provided, including:
a plurality of sub-pixel regions at a first base substrate, each of the plurality of sub-pixel regions including a light-blocking region and aperture regions located at opposing sides of the light-blocking region; and
a first transparent electrode and a second transparent electrode within each of the plurality of sub-pixel regions, configured to drive a liquid crystal layer;
wherein the first transparent electrode comprises a first electrode unit located inside the light-blocking region and including a plurality of first sub-electrodes, wherein each of the plurality of first sub-electrodes are separated from two adjacent first sub-electrodes by a separation distance; and
wherein the separation distance between two adjacent first sub-electrodes nearest to a center line of the light-blocking region is smaller than the separation distance between two adjacent first sub-electrodes nearest to an edge of the light-blocking region.

In some embodiments, the plurality of first sub-electrodes are divided into two groups; and the two groups are mirrored and symmetric to one another about the center line of the light-blocking region.

In some embodiments, the light-blocking region includes one central region and at least two periphery regions that are located on opposing sides of the central region;
the separation distance between two adjacent first sub-electrodes inside the central region is uniform;
the separation distance between two adjacent first sub-electrodes inside each one of the at least two periphery regions is uniform; and
the separation distance between two adjacent first sub-electrodes inside the central region is smaller than the separation distance inside each one of the at least two periphery regions.

In some embodiments, the at least two periphery regions comprise at least four periphery regions, wherein the at least four periphery regions are arranged so as to mirror symmetrically about the central region; and
the separation distance between two adjacent first sub-electrodes increases along a direction, which is parallel to a surface of the first base substrate, away from the central region.

In some embodiments, the separation distance between two adjacent first sub-electrodes increases along a direction, which is parallel to a surface of the first base substrate, away from the center line of the light-blocking region.

In some embodiments, the display substrate further includes:
a light extraction structure arranged inside the light-blocking region, wherein the light extraction structure is configured to fetch the light transmitted by a total reflection within a backlight source.

In some embodiments, the light extraction structure includes light extraction gratings.

In some embodiments, the light extraction gratings are arranged on the first base substrate;
the second transparent electrode is on a side of the light extraction gratings away from the first base substrate; and
the first transparent electrode is on a side of the second transparent electrode away from the first base substrate.

In some embodiments, the first transparent electrode further comprises a second electrode unit located inside the aperture regions and including a plurality of second sub-electrodes, each two adjacent second sub-electrodes separating with each other and having a second distance; and the second distance inside the aperture regions is uniform.

In some embodiments, one of the first transparent electrode and the second transparent electrode is a pixel electrode, and the other one is a common electrode.

In some embodiments, a pitch of the first sub-electrodes increases progressively from the center line of the light-blocking region towards the edge of the light-blocking region.

In some embodiments, the pitch ranges between 3 μm+half a size of a first sub-electrode among the first sub-electrodes adjacent to the center line+half a size of a second sub-electrode neighboring the first sub-electrode, and 7 μm+half a size of a third sub-electrode among the first sub-electrodes adjacent to the edge+half a size of a fourth sub-electrode neighboring the third sub-electrode.

In some embodiments, a display panel is provided, including:
the display substrate;
a color film substrate on a side of the first transparent electrode away from the second transparent electrode;
the liquid crystal layer between the display substrate and the color film substrate.

In some embodiments, the color film substrate comprises a second base substrate and a black matrix arranged over the second base substrate;

the black matrix defines a plurality of sub-pixel regions of the color film substrate; the sub-pixel regions of the color film substrate correspond to the sub-pixel regions of the display substrate in a one-to-one correspondence;

each sub-pixel region of the color film substrate includes a light-blocking region and aperture regions located at the opposite sides of the light-blocking region;

the light-blocking regions of the color film substrate correspond to the light-blocking regions of the display substrate in a one-to-one correspondence;

the aperture regions of the color film substrate correspond to the aperture regions of the display substrate one-to-one; and light-blocking patterns are disposed inside the light-blocking regions of the color film substrate.

In some embodiments, an orthographic projection of the sub-pixel regions of the color film substrate on the first substrate coincides with an orthographic projection of the sub-pixel regions of the display substrate on the first substrate.

In some embodiments, the light-blocking patterns and the black matrix are at a same layer and made of a same material.

In some embodiments, light-blocking patterns cross through at least one sub-pixel region of the color film substrate.

In some embodiments, the light-blocking regions of the color film substrate and the aperture regions of the color film substrate are in a column direction, the light-blocking patterns in the sub-pixel regions of the color film substrate being of same row are connected; or the light-blocking regions of the color film substrate and the aperture regions of the color film substrate are in a row direction, the light-blocking patterns in the sub-pixel regions of the color film substrate being of same column are connected.

In another aspect, a display assembly is provided, including:

the display panel; and a collimated light source, wherein the collimated light source includes a light source and a light-guide plate, the light-guide plate includes a light-emitting side and a light incident side arranged opposite the light-emitting side, configured to enable light reaching the light-guide plate to be transmitted through the light-incident side;

the display panel includes a plurality of light extraction structures; and the plurality of light extraction structures are arranged on the light-emitting side of the light-guide plate so as to fetch the light transmitted by a total reflection within the light-guide plate.

In some embodiments, the light-guide plate and the first base substrate of the display substrate have an integrated structure.

BRIEF DESCRIPTION OF DRAWINGS

To more clearly illustrate some of the embodiments, the following is a brief description of the drawings.

The drawings in the following descriptions are only illustrative of some embodiments. For those of ordinary skill in the art, other drawings of other embodiments can become apparent based on these drawings.

DETAILED DESCRIPTION

Reference will now be made in detail to some embodiments, examples of which are illustrated in the accompanying drawings. The following description refers to the accompanying drawings in which same numbers in different drawings may represent the same or similar elements unless otherwise represented. The implementations set forth in the following description of some embodiments do not represent all implementations consistent with the disclosure. Instead, they are merely examples of apparatuses and methods consistent with aspects related to the disclosure as recited in the appended claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or other structure is referred to as being "on" or extending "onto" another element, it can be directly on or extend directly onto the other element or intervening elements may also be present. In contrast, when an element is referred to as being "directly on" or extending "directly onto" another element, there are no intervening elements present.

Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "horizontal" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

A collimated light source liquid crystal display typically includes a collimated light source and a display panel. The display panel includes a plurality of sub-pixel regions. The collimated light emitted by the collimated light source passes through light extraction openings to reach corresponding sub-pixel regions, and the positions of the light extraction openings can have a one-to-one correspondence with the positions of the sub-pixel regions.

The collimated light source display, as discussed for purposes of example herein, can include: a display substrate includes a plurality of pixel electrodes and a plurality of common electrodes, both of the a plurality of pixel electrodes and a plurality of common electrodes can be arranged over the display substrate, the pixel electrodes and/or common electrodes are extended or elongated electrodes, herein referred to as slit electrodes, the pixel electrodes and/or common electrodes can be employed so as to form planefield in order to drive the liquid crystal molecules to tilt and thus control the display process.

In various embodiments discussed herein, each slit electrode can be composed of a plurality of sub-electrodes, wherein a plurality of slits or channels are arranged among the plurality of sub-electrodes. In some technologies, the widths of the slits or channels of a slit electrode are designed to be the same, although light-emitting angles can be ensured, the problem of cross-color may occur, which is the technical problem solved by the embodiments of the present disclosure.

The inventors of the present disclosure have recognized that, in some collimated light display technologies, electrodes are designed to be narrowly spaced in equal distances, maximum light-emitting angles of light corresponding to the central regions of the light-blocking patterns can be ensured, light-emitting efficiency is therefore improved. However, light corresponding to the periphery regions of the light-blocking patterns will also have maximum light-emitting angles, as a result, the problem of cross-color may occur.

Figure 1:
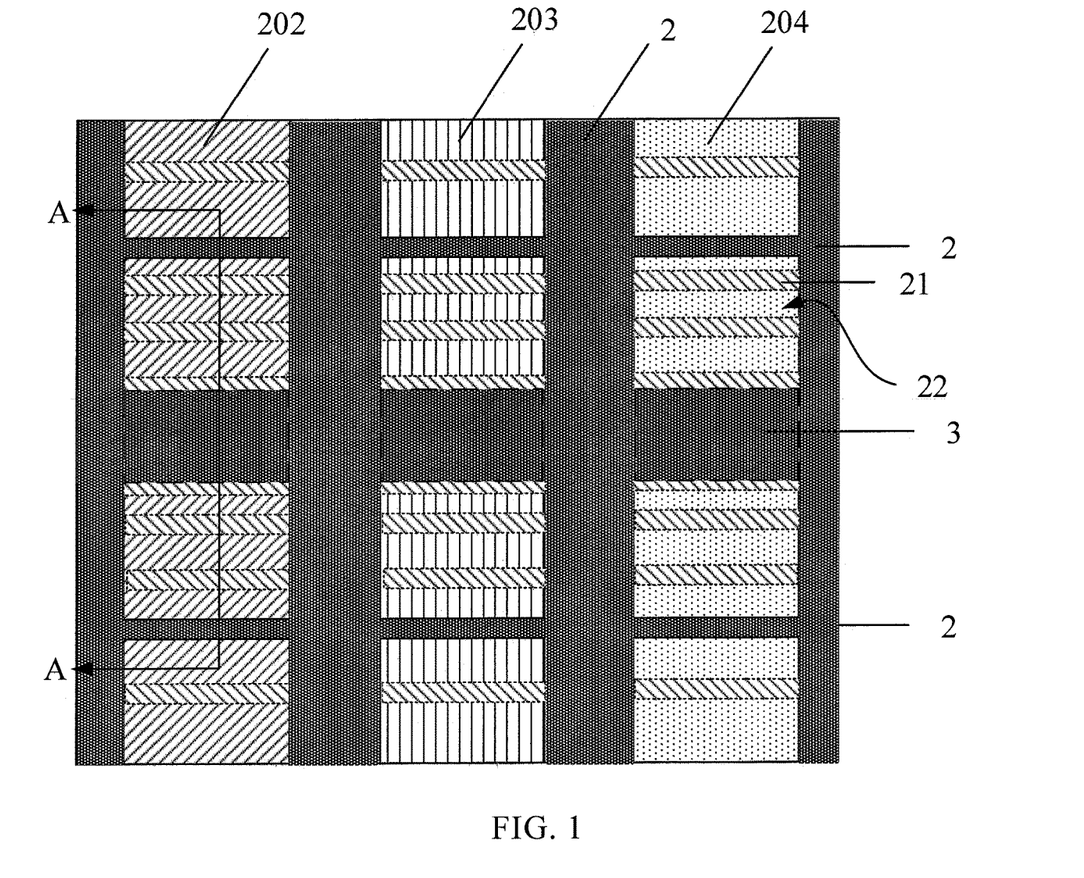
FIG. 1 is a schematic structural diagram of a display assembly according to some embodiments of the present disclosure being illustrative of various embodiments of the present disclosure.
Figure 2:
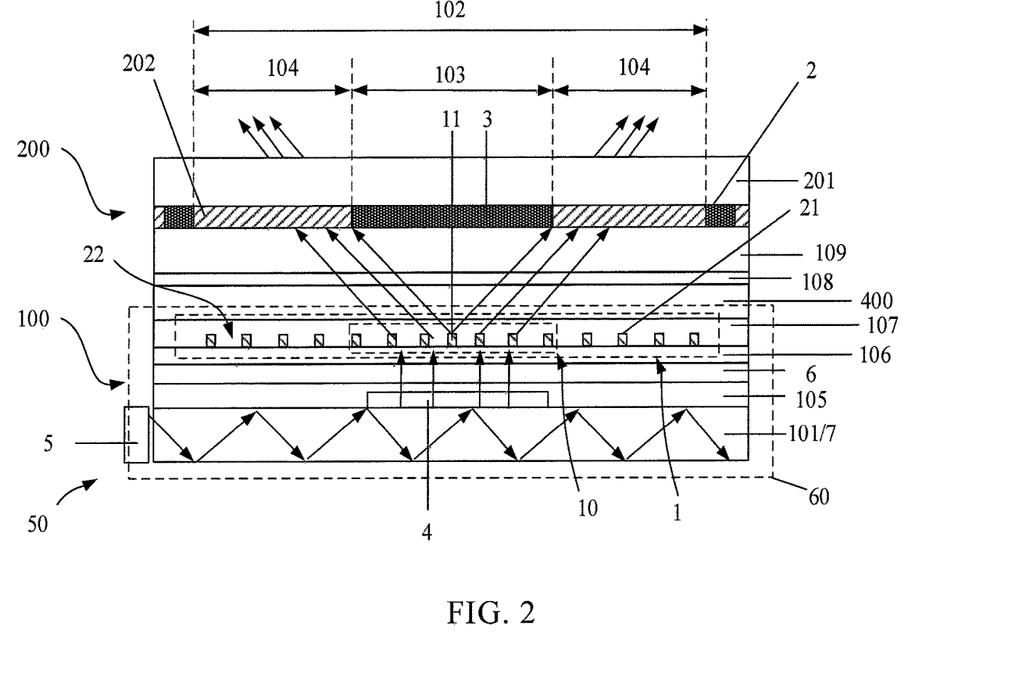
FIG. 2 is a cross-sectional view of the display assembly of FIG. 1 being depicted in a bright working state along section line A-A' being illustrative of various embodiments of the present disclosure.

With reference to FIG. 1 and FIG. 2, various embodiments of the present disclosure provide a display substrate 100, a display panel 60 utilizing the display substrate 100, as well as a display assembly 50 which utilizes the display panel 60 and associated display substrate 100 in conjunction with a color film substrate 200. The display substrate 100 as contemplated herein can be utilized so as to mitigate or eliminate cross-color issues as realized in various existing collimated light source display technologies as will be discussed in more detail below.

Some embodiments of the present disclosure provide various plane-field liquid crystal display components, the plane-filed liquid crystal display components includes a collimated light source liquid and crystal display components.

In some embodiments of the present disclosure, collimated light source liquid crystal display components can be implemented, in which: the main structures of a collimate light source liquid crystal display component can include a collimated light source and a display panel, wherein the display panel can include a plurality of sub-pixel regions, and wherein the collimated light emitted by the collimated light source passes through a plurality of light extraction openings and subsequently reaches corresponding sub-pixel regions, wherein positions of the light extraction openings correspond to positions of the sub-pixel regions one-to-one.

The main structures of the display panel can include a color film substrate and a display substrate typically arranged cassette-to-cassette with liquid crystal layer filled between the color film substrate and the display substrate.

A pixel electrode and a common electrode are also arranged in each sub-pixel region of the display substrate, wherein the pixel electrode and/or the common electrode can be provided as slit electrodes which can then be employed so as to form a plane-field that drives the liquid crystal molecules in the liquid crystal layer to tilt.

The color film substrate can then also include a black matrix, which is employed to define or separate a plurality of sub-pixel regions. In this manner, a light-blocking pattern is in each sub-pixel region, wherein the orthographic projections of the light extraction openings on a plane where the color film substrate is located is in regions where the light-blocking patterns are located.

When no driving electric field is applied, the liquid crystal molecules are not tilted, the collimated light fetched from the light extraction openings is blocked by the light-block patterns, which results a dark state of the display.

When a driving electric field is applied, the liquid crystal molecules are tilted to form liquid crystal prisms that deflect the collimated light entered, then results in the light being emitted from the periphery regions of the light-blocking regions, thus allowing for a bright state display to be realized. In some additional embodiments, varying the degree of deflection of the light can also allow different gray scales to be realized based on the variegation of degree of deflection.

In order to solve the problem of cross-color contamination of some collimated light source liquid crystal display components, the display substrate in accordance with some embodiments the present disclosure instead provides a display substrate having slit electrodes having slits or channels of varying widths and where the light-blocking patterns of the collimated light source liquid crystal display associated with each slit or channel are also designed to be different.

In some embodiments, the widths of the slits or channels corresponding to the central region of a light-blocking pattern can be smaller or narrower compared with those at other regions. As a result, it is ensured that the light corresponding to the central region has larger light-emitting angles and larger light transmittance.

Conversely, the widths of the slits or channels corresponding to the periphery regions of a light-blocking pattern can be larger or wider, which results in the light corresponding to the periphery regions having smaller light-emitting angles.

In other words, the slits corresponding to the periphery regions of the light-blocking pattern can have narrower apertures about a central region and larger or wider apertures about edge regions. In some embodiments the apertures can gradually increase in width from a central portion and become wider as approaching an edge of each light-blocking pattern of the substrate for each pixel. This variation of light-emitting angles from the central portion as opposed to the edge portion effectively eliminates cross-contamination between adjacent sub-pixel regions.

In the following, with reference to the drawings of the embodiments disclosed herein, technical solutions of various embodiments of the present disclosure will be described in greater detail.

FIG. 1 shows a schematic structural diagram of a display assembly utilizing a display substrate in accordance with some embodiments of the present disclosure. FIG. 2 is a cross-sectional view of the display assembly of FIG. 1 along section line A-A in bright working state configuration.

In these embodiments, a display assembly 50, which includes both a display substrate 100 and a color film substrate 200 are both provided utilized therein. As illustrated in FIG. 1 and FIG. 2, a display substrate 100 according to embodiments of the present disclosure, and as illustrated herein for purposes of example, can include a collimated light source liquid crystal display component.

Also as illustrated here, the display substrate 100 can include a plurality of sub-pixel regions 102, wherein each sub-pixel region 102 can then include a light-blocking region 103 and aperture regions 104 located at two different sides of the light-blocking region 103. The display substrate 100 can then include a first transparent electrode 1 and a second transparent electrode 6 which can then be arranged inside each sub-pixel region 102, wherein the first transparent electrode 1 and the second transparent electrode 6 can then be utilized to form electric fields that drive the liquid crystals within the liquid crystal layer 400 to tilt.

Figure 4:
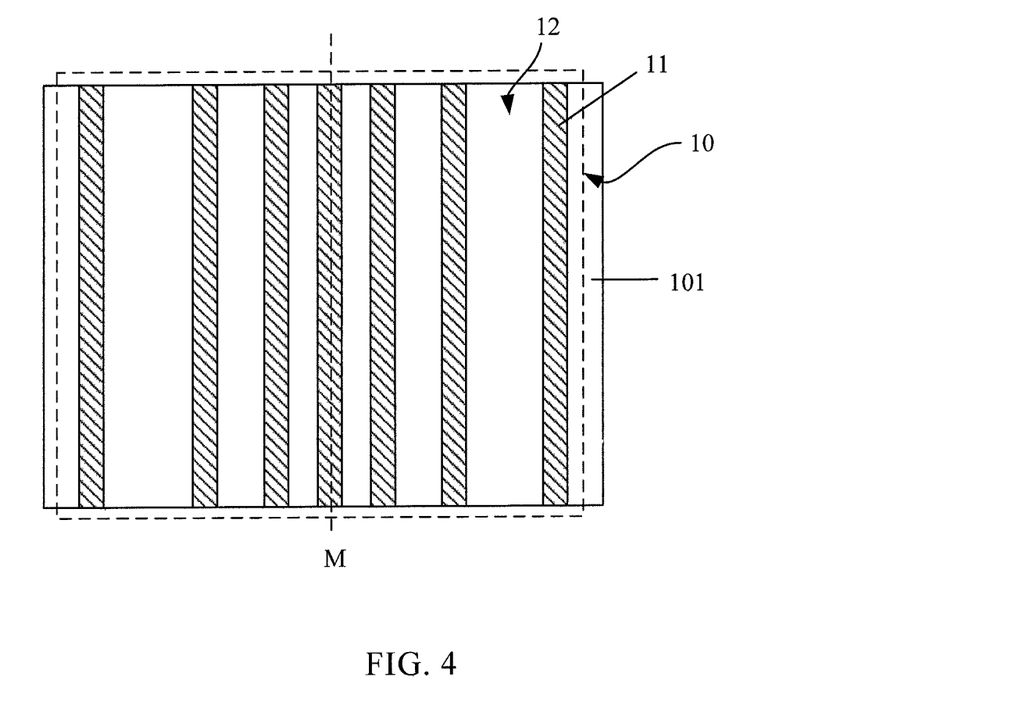
FIG. 4 is a schematic structural diagram of a first electrode unit of one or more first transparent electrodes being adaptable for use in the display assembly of FIG. 1 according to some embodiments of the present disclosure being illustrative of various embodiments of the present disclosure.

FIG. 4 is a schematic structural diagram of the first electrode unit of the first transparent electrode of FIG. 1.

With reference to FIG. 1, FIG. 2 and FIG. 4, the first transparent electrode 1 can include a first electrode unit 10 located inside a light-blocking region 103, wherein the first electrode unit 10 can then include a plurality of first sub-electrodes 11.

As illustrated herein, the plurality of first sub-electrodes 11 and the light-blocking region 103 and the aperture regions 104 can extend in a common direction, i.e. parallel to one another. In this manner a plurality of first slits 12 (or channels, apertures, etc.) are formed and arranged between adjacent first sub-electrodes 11. As illustrated herein, the first electrode unit 10 will have a plurality of slits 12 formed therein each having an associated width, when viewed from a top surface, the light-blocking regions 11 define the slits 12 therebetween.

Additionally, the slits can be formed having a smaller width at a central region 300 and an increasing width when moving laterally toward the lateral edges thereof. In other words, the slits are thinner at the central region 300, and wider at a periphery region 301, and wider still in an edge region 302. In other words, from the center of the light-blocking region 103 to the sides where the light-blocking region 103 and the aperture regions 104 are connected, the widths of the first slits or channels 12 increase.

The distance from the center of a sub-electrode to the center of an adjacent sub-electrode may be referred to as a pitch, and each pitch corresponds to a slit between adjacent sub-electrodes, accordingly. The sizes of pitches are smaller at the central region 300 than at other regions. For example, the pitches are larger at a periphery region 301 than at the central region 300, and are progressively larger at an edge region 302.

In other words, from the center of the light-blocking region 103 to the sides where the light-blocking region 103 and the aperture regions 104 are connected, the pitches increase.

In the technical solutions described above, each sub-pixel region of the display substrate can include a light-blocking region and aperture regions located at different sides of the light-blocking region. Then a plurality of first sub-electrodes, which are located inside the light-blocking region can be arranged in each sub-pixel region, wherein the widths of the slits or channels among the first sub-electrodes of the central region of the light-blocking region can be smaller than the widths of the slits or channels among the first sub-electrodes of the periphery regions of the light-blocking region, and the pitches among the first sub-electrodes of the central region of the light-blocking region can be smaller than the pitches among the first sub-electrodes of the periphery regions of the light-blocking region.

In this manner, the curvature of the liquid crystal prisms formed by the liquid crystal corresponding to narrower slits or channels can be larger, wherein the deflection angles of the light can be larger. As a result, the light-emitting angles of the central region of the light-blocking region can be larger, thus allowing for increase light-emitting efficiency.

Meanwhile, the curvature of the liquid crystal prisms formed by liquid crystal corresponding to wider slits or channels can be smaller, and the corresponding deflection angles of the light can be smaller, as a result, the light-emitting angles of the periphery and edge regions of the light-blocking region can also be smaller, in this manner the light will not emit to adjacent sub-pixel regions, and the problem of cross-color can therefore be solved.

Figure 6:
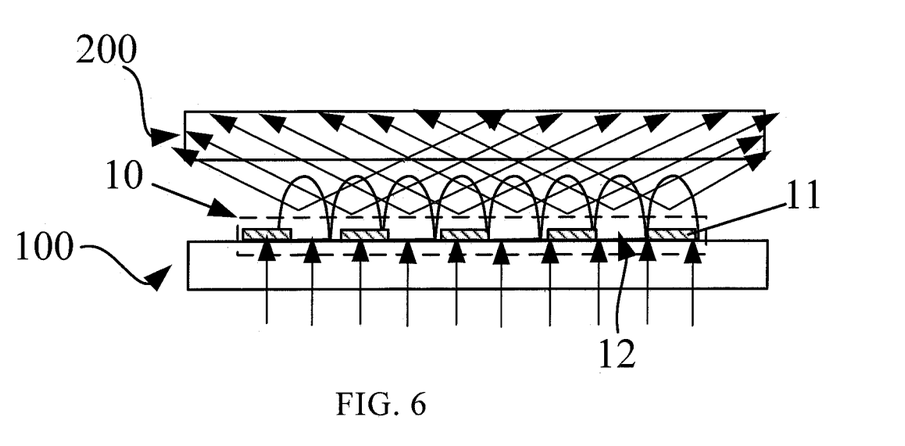
FIG. 6 illustrates a first light path diagram illustrating a first width of the slits between a plurality of first sub-electrodes in a bright working state according to some embodiments of the present disclosure being illustrative of various embodiments of the present disclosure.
Figure 7:
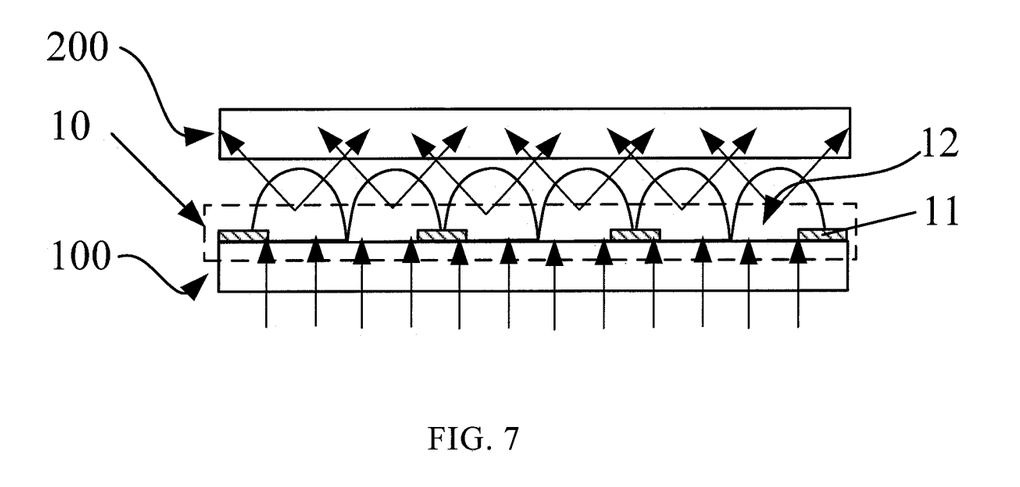
FIG. 7 illustrates an alternative light path diagram illustrating an alternative width of the slits between a plurality of first sub-electrodes in bright working state according to some embodiments of the present disclosure.

FIG. 6 and FIG. 7 illustrate light path diagrams showing different widths of the slits or channels among the first sub-electrodes as utilized in a bright working state according to some embodiments of the present disclosure.

Figure 5:
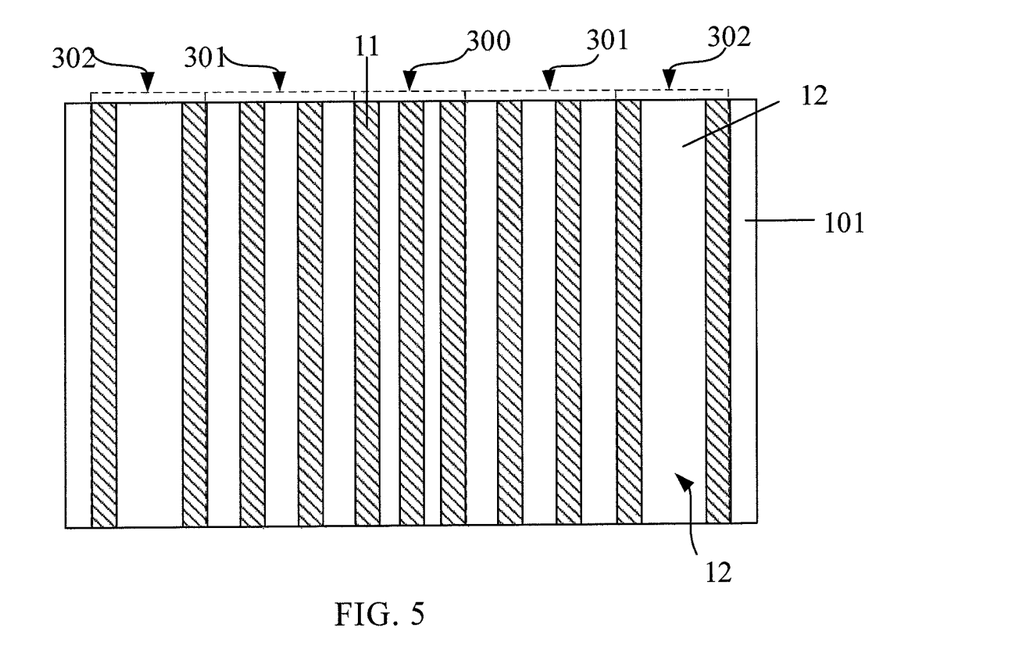
FIG. 5 is another alternative schematic structural diagram of another first electrode unit of one or more first transparent electrodes being adaptable for use in the display assembly of FIG. 1 according to some other embodiments of the present disclosure being illustrative of various embodiments of the present disclosure.

As illustrated in FIG. 6, when the first slits or channels 12 among the first sub-electrodes 11 of the first electrode unit 10 of the first transparent electrode 1 are relatively narrow, for example compared with those located at edge regions

302 as illustrated in FIG. 5, then the associated curvature of the liquid crystal prisms formed by the liquid crystal are correspondingly larger, and the associated deflection angles of the light are larger, thus allowing higher light-emitting efficiency.

As illustrated in FIG. 7, when the first slits or channels 12 among the first sub-electrodes 11 of the first electrode portion 10 of the first transparent electrode 1 are wider than those illustrated in FIG. 6, the curvature of the liquid crystal prims formed by the liquid crystal are correspondingly smaller, and the associated deflection angles of the light are smaller, thus resulting in a lower light-emitting efficiency.

For example, when the widths of the first slits or channels 12 among the first sub-electrodes 11 are 3 μm, the light-emitting efficiency is 15.8%. In yet another example, when the widths of the first slits or channels 12 among the first sub-electrodes 11 are 4 μm, the light emitting efficiency is 11%. Further, when the widths of the first slits or channels 12 among the first sub-electrodes 11 are 5 μm, the light-emitting efficiency is 9.2%.

According to some embodiments of the present disclosure, the specific designs of the structures corresponding to the first electrode unit 10 may be varied, in the following, it will be described in detail.

In some embodiments of the present disclosure, and as illustrated in FIG. 4, for any two adjacent first slits or channels 12 that are located at the same side of the center line M of the light-blocking region 103, the width of a first slit 12 that is closer to an aperture region 104 can be larger than the width of a first slit 12 that is closer to the center line M. In this embodiment, the center line M is a straight line passing through the center of the light-blocking region 103 and parallels with the sides where the light-blocking region 103 and the aperture regions 104 are connected.

In other words, the first slits or channels can have a narrower width at a central portion about the center line M and increase in width for slits moving away from the center line M toward an edge portion thereof.

In some embodiments, in order to simplify the structure of the first transparent electrode 1, the first slits or channels 12 can be located at two different or opposing sides of the center line M of the light-blocking region 103. In other words, the slits or channels can be configured so as to be mirrored about the center line M, or in other words the plurality of first slits or channels 12 can be symmetric about the center line M.

Of course, the first slits or channels 12 located at two different sides of the center line M of the light-blocking region 103 also can also be configured in a manner so as to not be mirrored or symmetric but still be increasing in width moving from the center line M to an edge portion thereof.

In some embodiments, for all first slits or channels 12 located at the same side of the center line M of the light-blocking region, the value difference between the widths of any two adjacent first slits or channels 12 can be the same, that is, in the direction from the center of the light-blocking region 103 to the sides where the light-blocking region 103 and the aperture regions 104 are connected, the widths of the first slits or channels can increase in arithmetic progression. Similarly, in the direction from the center of the light-blocking region 103 to the sides where the light-blocking region 103 and the aperture regions 104 are connected, the pitches among the first sub-electrode can increase in arithmetic progression.

For example, the width of the first slit 12 provided about the opposing sides of the center line M of the light-blocking region can be 3 μm, in the direction from the center of the light-blocking region 103 to the sides where the light-blocking region 103 and the aperture regions 104 are connected, the widths of the first slits or channels 12 can increase with a common difference that is equal to, for example, 0.2 μm or 0.4 μm or 0.6 μm.

Of course, the value difference between the widths of two adjacent first slits or channels 12 located at the same side of the center line M of the light-blocking region can also be different.

Similarly, the pitches among the first sub-electrodes provided about the opposing sides of the center line M of the light-blocking region can be 3 μm+half the size of a first sub-electrode in a horizontal direction+half the size of an adjacent first sub-electrode, in the direction from the center of the light-blocking region 103 to the sides where the light-blocking region 103 and the aperture regions 104 are connected. The pitches among the first sub-electrodes can increase with a common difference that is equal to, for example, 0.2 μm or 0.4 μm or 0.6 μm.

In some embodiments, for all first slits or channels 12 located at the same side of the center line M of the light-blocking region, the value difference between the widths of any two adjacent first slits or channels 12 can be the same, and the first slits or channels 12 at two different sides of the center line M of the light-blocking region can be arranged in a symmetrical or mirrored configuration, as a result, the structure of the first transparent electrode 1 can be further simplified.

FIG. 5 is another schematic structural diagram of the first electrode unit of the first transparent electrode of FIG. 1 according to some other embodiments of the present disclosure.

In some embodiments, as illustrated in FIG. 5, in the direction of the plurality of first sub-electrodes 11, the light-blocking region 103 can be divided into a central region 300, periphery regions 301, and edge regions 302, which can be located at the two different sides of the central region 300. The widths of the first slits or channels 12 located in the central region 300 can be the same, while the widths of the first slits or channels 12 located in the periphery regions 301 or edge regions 302 can be progressively larger than the widths of the first slits or channels 12 located in the central region 300.

As illustrated herein, the regions can progress from a central region 301, to a periphery region 302 to an edge region 302 being between the periphery regions 301 and an edge of a first sub-electrode unit 10.

In some embodiments, for each two adjacent periphery regions 301, the widths of the first slits or channels 12 of the periphery region 301 that is closer to the central region 300 can be smaller than the widths of the first slits or channels 12 of the other edge region 302.

In some alternative embodiments, for each two adjacent periphery regions 301, the widths of the first slits or channels 12 of the periphery region 301 that is closer to the central region 300 can also be larger than the widths of the first slits or channels 12 of the other edge region 302, as long as the first sub-electrodes 11 of the periphery regions 301 can properly form a required liquid crystal prism curvature, in this manner the light-emitting angles are sufficiently small such that any problems with respect to cross-color of adjacent sub-pixel regions can be effectively prevented.

In some embodiments, the value difference between the widths of the first slits or channels 12 of the periphery region 301 that is close to the central region 300 and the widths of the first slits or channels 12 of the central region 300 can be equal to the value difference between the widths of the first slits or channels 12 of any two periphery regions 301.

For example, in the case in which two periphery regions are arranged at one side of the central region, the widths of all first slits or channels 12 of the central region 300 can be 3 μm, the widths of all first slits or channels 12 of the periphery region 301 can be 3.5 μm, and the widths of all the first slits or channels 12 of the edge region 302 can be 4 μm.

Accordingly, the pitches among all first sub-electrodes of the central region 300 can be 3 μm+half the size of a sub-electrode in a horizontal direction+half the size of an adjacent first sub-electrode in a horizontal direction. The pitches among all first sub-electrodes of the periphery region 301 can be 3.5 μm+half the size of a first sub-electrode in a horizontal direction+half the size of an adjacent first sub-electrode in a horizontal direction. The pitches among all first sub-electrodes of the edge region 302 can be 4 μm+half the size of a first sub-electrode in a horizontal direction+half the size of an adjacent first sub-electrode in a horizontal direction.

In another example, in the case in which more than one periphery region is arranged on one side of the central region, the widths of all first slits or channels 12 of the central region 300 can be 3 μm, the widths of all first slits or channels 12 of a first periphery region 301 can be 4 μm, and the widths of all the first slits or channels 12 of an additional periphery region (not shown) between the periphery region 301 and the edge region 302 can be 5 μm, where the edge region can be increased accordingly, for example up to 6 μm so as to account for an additional periphery region, or for any additional periphery regions inserted therebetween.

Accordingly, the pitches among all first sub-electrodes of the central region 300 can be 3 μm+half the size of a first sub-electrode in a horizontal direction+half the size of an adjacent first sub-electrode in a horizontal direction; the pitches among all first sub-electrodes of a first periphery region 301 can be 4 μm+half the size of a first sub-electrode in a horizontal direction+half the size of an adjacent first sub-electrode in a horizontal direction; and the pitches among all first sub-electrodes of an additional periphery region (not shown) between the periphery region 301 and the edge region 302 can be 5 μm+half the size of a first sub-electrode in a horizontal direction+half the size of an adjacent first sub-electrode in a horizontal direction.

The pitches among all first sub-electrodes of the edge region can be increased accordingly, for example up to 6 μm+half the size of a first sub-electrode in a horizontal direction+half the size of an adjacent first sub-electrode in a horizontal direction so as to account for an additional periphery region, or for any additional periphery regions inserted therebetween.

In yet another example, in the case that two periphery regions are arranged at one side of the central region, the widths of all first slits or channels 12 of the central region 300 can be approximately 3 μm, the widths of all first slits or channels 12 of the periphery region 301 that is close to the central region 300 can be 5 μm, and the widths of all the first slits or channels 12 of the other periphery region 301 can be 7 μm.

Accordingly, the pitches among all first sub-electrodes of the central region 300 can be 3 μm+half the size of a first sub-electrode in a horizontal direction+half the size of an adjacent first sub-electrode in a horizontal direction; the pitches among all first sub-electrodes of the periphery region 301 that is close to the central region 300 can be 5 μm+half the size of a first sub-electrode in a horizontal direction+half the size of an adjacent first sub-electrode in a horizontal direction; the pitches among all first sub-electrodes of the other periphery region 301 can be 7 μm+half the size of a first sub-electrode in a horizontal direction+half the size of an adjacent first sub-electrode in a horizontal direction.

It should be noted that, the number of periphery regions 301 arranged at one side of the central region 300 is not limited to two, but instead there are no limitations to the number of periphery regions 301, the configuration of two periphery regions in the above description is just an example. Further, the number of periphery regions 301 on opposing sides of the central region 300 may be the same or may be different and thus not need be mirror images of one another.

In some embodiments, the first electrode unit 10 of the first transparent electrode 1 may be divided into different divisions, and the widths of the first slits or channels 12 of each division may be configured as the same. As a result, the increasing trend of the widths of the first slits or channels in the direction from the center of the light-blocking region to the sides where the light-blocking region and the aperture regions are connected will be observed.

In the embodiments described above, two specific distribution methods of the first slits or channels of the first electrode unit are provided to achieve the purpose of the present disclosure, e.g., to effectively solve the problem of cross-color contamination in prior art systems, however, the distribution methods of the first slits or channels of the first electrode unit are not limited to these two methods described above, which varying width arrangements are contemplated herein but will not be further described in detail herein.

In some embodiments, the first transparent electrode 1 can further include a second electrode unit located at the aperture regions 104, the second electrode unit can then include a plurality of second sub-electrodes 21. As illustrated herein the second sub-electrodes 21 and the first sub-electrode 11 can extend in a common direction, being parallel to one another. Further, as illustrated, the widths of the second slits or channels 22 between any two adjacent second sub-electrodes 21 can be the same. Accordingly, the pitches among any two adjacent second sub-electrodes can be the same.

Of course, according to some other embodiments of the present disclosure, in the second electrode unit, the widths of the second slits or channels may also increase in the direction from the side close to the light-blocking region to the sides that are opposite from the light-blocking region. Accordingly, the pitches among the second sub-electrodes may also increase in the direction from the side close to the light-blocking region to the sides that are opposite from the light-blocking region.

As illustrated herein, the second electrode unit does not correspond to the position of the light extraction opening, thus it will not influence the light-emitting angle. Therefore, the second electrode unit may also be provided as a blocking electrode.

In some embodiments, the first transparent electrode 1 may be a common electrode to that of the display substrate, wherein the second transparent electrode 6 may be a pixel electrode. Alternatively, the first transparent electrode 1 may be a pixel electrode, while the second transparent electrode 6 may be a common electrode.

In some embodiments, the material of first transparent electrode and second transparent electrode can be indium tin oxide (ITO), aluminum zinc oxide (AZO), indium zinc oxide (IZO) or zinc oxide (ZnO) or any combination thereof.

As illustrated in FIG. 2, according to various embodiments of the present disclosure, the first transparent electrode 1 can be arranged at the side of the second transparent electrode 6 that is opposite from the first base substrate 101. In some such embodiments, there can be an insulating layer 106 arranged between the first transparent electrode 1 and the second transparent electrode 6.

Of course, the positions of the first transparent electrode 1 and the second transparent electrode 6 may also be switched.

In some embodiments, the second transparent electrode 6 can be provided as a band electrode. In some such embodiments, the second transparent electrode 6 may then also be provided as a slit electrode. Further, the second transparent electrode 6 may also have similar structures as the first transparent electrode 1 of the present disclosure.

In some embodiments, a light extraction structure 4 may be arranged in each light-blocking region 103. In some such embodiments, the light extraction structures 4 can be configured to fetch the light transmitted by the process of total reflection in the backlight source. Then the orthographic projections of the light extraction structures 4 over the light-blocking regions 103 can be located inside the light-blocking regions 103. The light extraction structures 4 can thus be employed so as to form the light extraction openings in the embodiments described above.

In some embodiments, the light extraction structures 4 can be light extraction gratings. Further, according to some other embodiments of the present disclosure, it is contemplated that other types of light extraction structures may also be adopted but that the light extraction structures discussed herein are made by way of example only.

Meanwhile, the display substrate may further include one or more planarization layers 105 and 109 respectively being located over the light extraction structures 4, which can cover the light extraction structures 4, the planarization layers 105 and 109 can then be utilized to provide flat relative surfaces.

In some embodiments, the widths of the first slits or channels can be between 3 μm and 7 μm. Accordingly, the pitches among the first sub-electrodes can vary between a pitch of 3 μm+half the size of a particular sub-electrode+half the size of an adjacent sub-electrode, and a pitch of 7 μm+half the size of a sub-electrode+half the size of an adjacent sub-electrode.

In another aspect, a display panel 60 is provided. As illustrated in FIG. 1 and FIG. 2, the display panel 60 can include a display substrate 100 and a color film substrate 200, which can then be arranged cassette-to-cassette, and wherein a liquid crystal layer 400 can then be filled between the display substrate 100 and the color film substrate 200.

The sub-pixel regions of the display substrate which can be provided so as correspond to the sub-pixel regions of the color film substrate one-to-one such that the display light of each sub-pixel region of the display substrate passes through the corresponding sub-pixel region of the color film layer to the display side. In the following example, for the purpose of clear illustration, the sub-pixel regions of the display substrate and the sub-pixel regions of the color film substrate will be indicated by the same marks.

In the examples discussed below, the display substrate can be any of the display substrates of any one of the embodiments described above.

The color film substrate 200 can include: a second base substrate 201 and a black matrix 2 arranged over the second base substrate 201. As such, the black matrix 2 defines a plurality of sub-pixel regions 102, wherein the sub-pixel regions 102 of the color film substrate 200 correspond to the sub-pixel regions 102 of the display substrate one-to-one.

As illustrated herein, each sub-pixel region 102 of the color film substrate can include a light-blocking region 103 and aperture regions 104 located at the two different sides of the light-blocking region 103. The light-blocking regions 103 of the color film substrate can then correspond to the light-blocking regions 103 of the display substrate one-to-one. The aperture regions 104 of the color film substrate can then correspond to the aperture regions 104 of the display substrate one-to-one, wherein a light-blocking pattern 3 can be arranged inside each light-blocking region 103 of the color film substrate.

In some embodiments, the light-blocking patterns 3 and the black matrix may be arranged at the same layer and made of the same material, in order to simplify the manufacturing process. Further, the light-blocking patterns 3 and the black matrix may be formed through the same patterning process.

In addition, a filter layer that lets light of specific colors to pass may be arranged at the regions other than the region where the light-blocking pattern 3 is located in each sub-pixel region 102 of the color film substrate. The filter layer may include a red color filter layer 202, a green color filter layer 203 and a blue color filter layer 204, wherein any color display may be realized through three primary colors, e.g., red color, green color and blue color. It should be noted that the specific method described above is only an example, the color combination scheme of the filter layer that realize dolor display are not limited to three primary colors.

In some embodiments, as illustrated in FIG. 1, the light-blocking regions 103 and the aperture regions 104 of the color film substrate may be in column direction, in this case, the light-blocking patterns 3 of the sub-pixel regions 102 of same row are connected.

Further, as illustrated herein, the light-blocking regions 103 and the aperture regions 104 of the color substrate may also be in a row direction, in this case, the light-blocking patterns 3 of the sub-pixel regions 102 of same column would then be connected.

In another aspect, a display assembly is provided, as illustrated in FIG. 2, the display assembly is a plane-field liquid crystal display assembly.

The abovementioned display assembly can be included in any products or components with a display functions such as cell phones, tablets, TV sets such as smart TVs, displays, notebook computers, digital picture frames, navigators, a virtual reality (VR)/augmented reality (AR) device, a head-mount display (HMD) device, a head-up display (HUD) device, smart eyewear (e.g., glasses), etc. Controlling the pixels can be implemented with thin-film transistors (TFTs), or other electronics configuration.

As illustrated in FIG. 2, the display assembly can include a display panel 60 and a collimated light source, the collimated light source can then include a light source 5 and a light-guide plate 7.

The light-guide plate can then include a light-emitting side and a light incident side, wherein the light-emitting side of the light source and the light-emitting side of the light-guide plate can be arranged facing each other. The light-guide plate can then be configured so as to enable any light which entered the light-guide plate through the light incident side to be transmitted by the process of total reflection.

The display panel 60 can be the display panel 60 in the aforementioned embodiments, the display substrate 100 can include the light extraction structures 4. In some such embodiments, the light extraction structures 4 can be arranged over the light-emitting side of the light-guide plate, such that the light extraction structures are configured to fetch the light that is transmitted by the process of total reflection in the light-guide plate.

The display assembly 50 can include a display substrate 100 and a color film substrate 200 arranged cassette-to-cassette and a liquid crystal layer 400 filled between the display substrate 100 and the color film substrate 200.

In some embodiments, the light-guide plate may also be employed as a first base substrate 101 of the display substrate 100, the light-emitting side of the light source 5 and the light incident side of the first base substrate 101 of the display substrate can be arranged facing each other. In some such embodiments, the first base substrate 101 can be configured to enable the light entered the first base substrate 101 through the light incident side to be transmitted by the process of total reflection.

In some embodiments, the light extraction structures may be arranged at the side of the first substrate 101 that is close to the color film substrate 200, it may also be arranged along a side portion of the first substrate 101 which side portion is opposite from the color film substrate 200.

In the embodiments described above, because the light-guide plate may also be employed as the first base substrate 101 of the display substrate 100, the thickness of the display assembly can thus be reduced.

Figure 3:
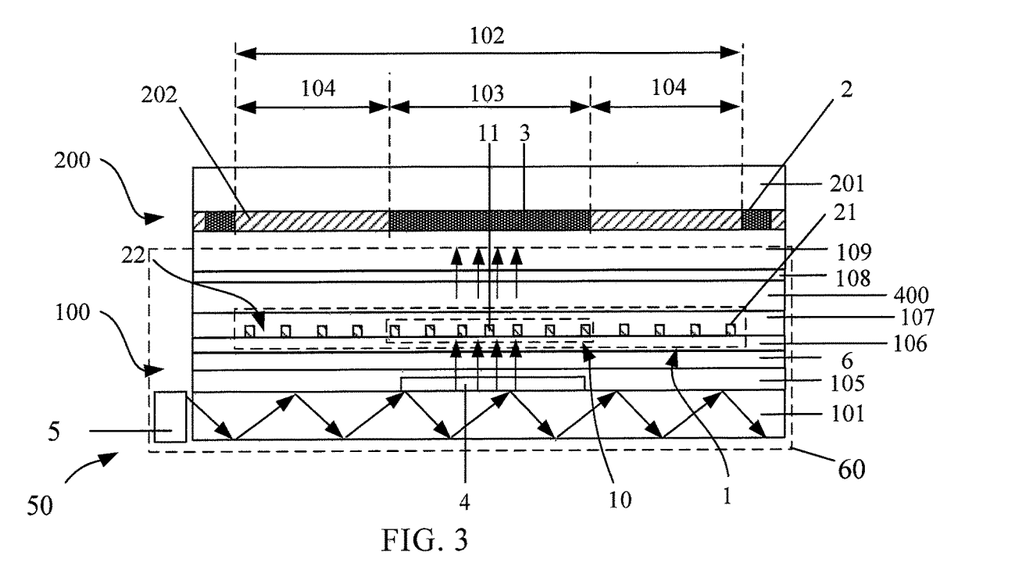
FIG. 3 is a cross-sectional view of the display assembly of FIG. 1 being depicted in a dark working state along section line A-A' being illustrative of various embodiments of the present disclosure.

The working process of the display assembly described above can include the following: as illustrated in FIG. 3, when no driving electric field is applied, the liquid crystal molecules do not tilt, the collimated light fetched from the light extraction structures 4 is blocked by the light-blocking patterns 3, dark state display is therefore realized.

In order to ensure the quality of dark state display, there is a certain distance between the outlines of the orthographic projections of the light extraction structures 4 over the plane where the color film substrate is located and the outlines of the light-blocking patterns 3, as a result, when no driving electric field is applied, it is ensured that the collimated light fetched by the light extraction structures 4 will be completely blocked by the light-blocking patterns 3, dark state display is therefore achieved.

As illustrated in FIG. 2, when a driving electric field is applied, the liquid crystal molecules are tilted and liquid crystal prisms are formed, the liquid crystal prisms will deflect the collimated light entered, and the light will emit from the aperture regions 104 located at the two sides of the light-blocking patterns, bright state display is realized, and display in different gray scales can be realized according to the degree of the deflection of the light.

As illustrated in FIG. 2, each sub-pixel region 102 of the display substrate can include a light-blocking region 103 and aperture regions 104 located at two different sides of the light-blocking region 103. A plurality of first sub-electrodes 11 can then be located inside the light-blocking region 103 and can be arranged in each sub-pixel region 102.

The widths of the slits or channels among the first sub-electrodes 11 of the central region of the light-blocking region 103 can be smaller than the widths of the slits or channels among the first sub-electrodes 11 of the periphery regions of the light-blocking region 103.

In this manner, the curvature of the liquid crystal prisms formed by the liquid crystal corresponding to narrower slits or channels can be larger, as such the corresponding deflection angles of the light can be larger. As a result, the light-emitting angles of the central region of the light-blocking region can be larger.

Further, the light-emitting efficiency can be ensured. Additionally, the curvature of the liquid crystal prisms formed by the liquid crystal corresponding to wider slits or channels can be smaller, wherein the corresponding deflection angles of the light can be smaller.

As a result, the light-emitting angles of the periphery regions of the light-blocking region can be smaller, in this manner it can be ensured that the light will not emit to adjacent sub-pixel regions. In this manner, the problem of cross-color can therefore be effectively solved, meanwhile, the widths of the sub-pixel regions can also be reduced, which is beneficial for achieving PPI.

In some embodiments, the display assembly can utilize a plane-field liquid crystal display assembly including a collimated light source.

Figure 8:
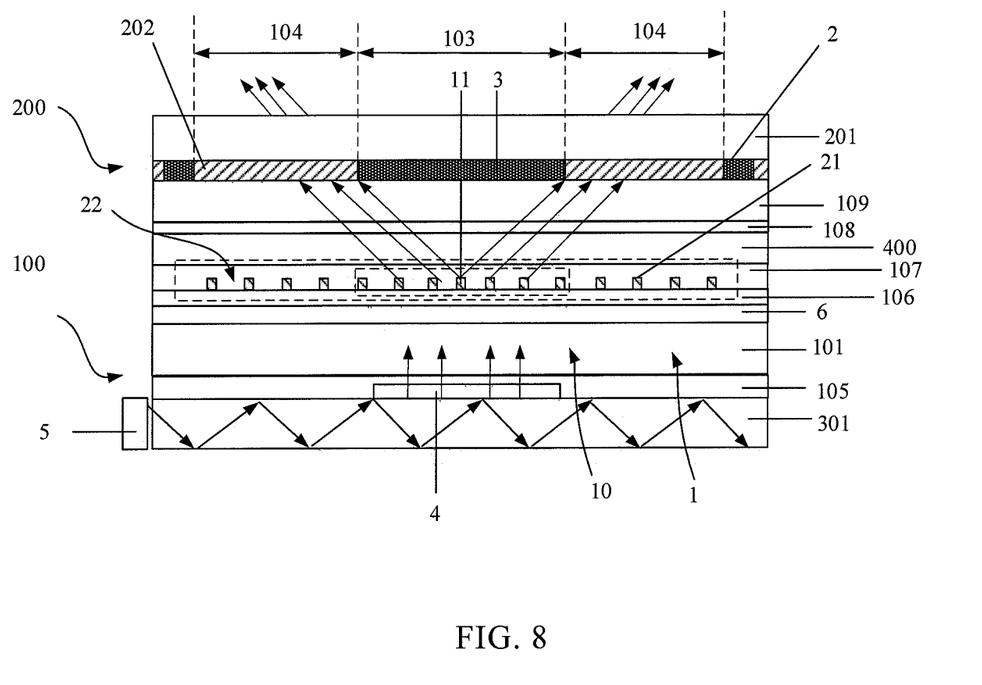
FIG. 8 is a schematic structural diagram of a display assembly according to some other embodiments of the present disclosure.

FIG. 8 illustrates a schematic structural diagram of the display assembly according to some other embodiments of the present disclosure.

As illustrated, the display assembly can include a display panel 60 and a collimated light source, the collimated light source can then include a light source 5, a light-guide plate 7, i.e. first base substrate, and light extraction structures 4.

The light-guide plate 7 can then include a light-emitting side and a light incident side, the light-emitting side of the light source 5 and the light incident side of the light-guide plate 7 can be arranged facing each other, the light-guide plate 7 can be configured to enable the light entered the light-guide plate 7 through the light incident side to be transmitted by the process of total reflection, the light extraction structures 4 can then be arranged over the light-emitting side of the light-guide plate 7, they can be configured to fetch the light in the light-guide plate 7 that are transmitted by the process of total reflection.

The display substrate can include a display substrate 100 and a color film substrate 200 arranged cassette-to-cassette and a liquid crystal layer 400 filled between the display substrate 100 and the color film substrate 200.

The positions of the light extraction structures 4 and the positions of the sub-pixel regions of the display panel 60 can correspond to each other one-to-one, wherein the orthographic projections of the light-extraction structures 4 over the color film substrate 200 can be located inside the regions where the light-blocking patterns 3 are located.

Compared with the embodiment of FIG. 2, the difference of the embodiment of FIG. 8 is the light extraction structures 4 are arranged inside the collimated light source, in the embodiment of FIG. 2, the light extraction structure 4 are arranged inside the display panel.

As illustrated in FIG. 1, FIG. 2 and FIG. 4, the collimated light source liquid crystal display assembly can include:

a display substrate 100 and a color film substrate 200 arranged cassette-to-cassette, and a liquid crystal layer 400 filled between the display substrate 100 and the color film substrate 200;

a light source 5, which is utilized to provided light;

wherein, the display substrate 100 can include:

a first base substrate 101, the first base substrate 101 can also be utilized as a light-guide plate, the light source 5 can be arranged close to the side of the first base substrate 101, the emitted light enters the first base substrate 101 through the side described above and is fetched from the inner chamber of the base substrate 101 by the process of total reflection;

Light extraction structures 4 can be arranged or otherwise placed over the surface of the first base substrate 101, which is utilized to fetch light from the surface of the first base substrate 101;

a planarization layer 105 that covers the light extraction structures 4.

The display substrate 100 can include a plurality of sub-pixel regions 102, each sub-pixel region 102 can then include a light-blocking region 103 and aperture regions 104 located at the two different sides of the light-blocking region 103, each sub-pixel region 102 can include:

a second transparent electrode 6 which can be arranged or otherwise placed over the planarization layer 105, the second transparent electrode 6 may be a pixel electrode;

a semi-conductor drive component (not shown in figures) can then also be arranged over the planarization layer 105, for example, the semi-conductor drive component can be provided as one or more thin-film transistors, which can then be utilized to transmit pixel voltage to the second transparent electrode 6;

an insulating layer 106 that covers the semi-conductor drive component and the second transparent electrode 6, the insulating layer 106 may be a passivation layer;

a first transparent electrode 1 which can be arranged or otherwise placed over the insulating layer 106, the first transparent electrode 1 may be a common electrode, the first transparent electrode 1 can include a first electrode unit 10 located at the light-blocking region, the first electrode unit 10 can include a plurality of first sub-electrodes 11, the direction of the plurality of first sub-electrode 11 and the direction of the light-blocking region 103 and the aperture regions 104 cam be the same, first slits or channels 12 can be located among the first sub-electrodes 11; in the direction from the center of the light-blocking region 103 to the sides where the light-blocking region 103 and the aperture regions 104 are connected, the widths of the first slits or channels can increase.

The first transparent electrode 1 can further include a second electrode unit located at the aperture regions 104, the second electrode unit can include a plurality of second sub-electrodes 21, the direction of the plurality of second sub-electrodes 21 and the direction of the first sub-electrode 11 can be the same, the widths of the second slits or channels 22 among any two adjacent second sub-electrodes 21 can be the same.

A first alignment film 107 can also be included, and can cover the first transparent electrode 1.

Wherein, the color film substrate 200 can include:

a second base substrate 201;

a black matrix 2 configured over the second base substrate 201, which is utilized to define a plurality of sub-pixel regions 102;

each sub-pixel region 102 of the color film substrate 200 can include:

a light-blocking pattern 3 located at the same layer with and made of the same material as the black matrix 2;

a filter layer filled in the regions of the sub-pixel region 102 other than the region where the light-blocking pattern 3 is located;

a second alignment film 108 that covers the filter layer, the black matrix 2 and the light-blocking pattern 3.

At least some embodiments of the present disclosure can have one or more of the following advantages.

For example, each sub-pixel region of the display substrate includes a light-blocking region and aperture regions located at two sides of the light-blocking region, a plurality of first sub-electrodes can then be arranged inside the light-blocking region of each sub-pixel region, the widths of the slits among the first sub-electrodes at the central region of the light-blocking region is smaller than the widths of the slits among the first sub-electrodes radially distant or at periphery regions of the light-blocking region, the pitches among the first sub-electrodes at the central region of the light-blocking region is smaller than the pitches among the first sub-electrodes radially distant or at periphery regions of the light-blocking region, the curvature of the liquid crystal prisms formed by the liquid crystal corresponding to narrower slits can be larger, such that the deflection angles of the light can then be larger.

As a result, the light-emitting angles of the central region of the light-blocking region can also be larger, such that light-emitting efficiency is increased.

Conversely, the curvature of the liquid crystal prisms formed by the liquid crystal corresponding to wider slits or larger pitches can instead be smaller. In this manner, the deflection angles of the light can be smaller, which, as a result, allows for the light-emitting angles of the periphery regions of the light-blocking region to also be smaller.

Further, in this manner the light associated with a region will not be emitted to any adjacent sub-pixel regions, which thus mitigates or solves the problem of cross-color contamination between adjacent sub-pixels.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion such that a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, the commodity, or the device including the element.

The foregoing has provided a detailed description on a display substrate, a display panel and a display assembly according to some embodiments of the present disclosure. Specific examples are used herein to describe the principles and implementations of some embodiments. The description is only used to help understanding some of the possible methods and concepts. Meanwhile, those of ordinary skill in the art may change the specific implementation manners and the application scope according to the concepts of the present disclosure. The contents of this specification therefore should not be construed as limiting the disclosure.

In the descriptions, with respect to unit(s), device(s), component(s), etc., in some occurrences singular forms are used, and in some other occurrences plural forms are used in the descriptions of various embodiments. It should be noted that, however, the single or plural forms are not limiting but rather are for illustrative purposes. Unless it is expressly stated that a single unit, device, or component etc. is employed, or it is expressly stated that a plurality of units, devices or components, etc. are employed, the unit(s), device(s), component(s), etc. can be singular, or plural.

Based on various embodiments of the present disclosure, the disclosed apparatuses, devices, and methods may be implemented in other manners. For example, the abovementioned display substrates, display panels and display assemblies are only of illustrative purposes, and other types of display substrates, display panels and display assemblies can employ the methods disclosed herein.

Dividing the device into different "regions," "units," or "layers," etc. merely reflect various logical functions according to some embodiments, and actual implementations can have other divisions of "regions," "units," or "layers," etc. realizing similar functions as described above, or without divisions. For example, multiple regions, units, or layers, etc. may be combined or can be integrated into another system. In addition, some features can be omitted, and some steps in the methods can be skipped.

Those of ordinary skill in the art will appreciate that the units, regions, or layers, etc. in the devices provided by various embodiments described above can be configured in the one or more devices described above. They can also be located in one or multiple devices that is (are) different from the example embodiments described above or illustrated in the accompanying drawings. For example, the units, regions, or layers, etc. in various embodiments described above can be integrated into one module or divided into several sub-modules.

The order of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation to encompass such modifications and equivalent structures.

The invention claimed is:

1. A display substrate, comprising:
a plurality of sub-pixel regions at a first base substrate, each of the plurality of sub-pixel regions including a light-blocking region and aperture regions located at opposing sides of the light-blocking region; and
a first transparent electrode and a second transparent electrode within each of the plurality of sub-pixel regions, configured to drive a liquid crystal layer;
wherein the first transparent electrode comprises a first electrode unit located inside the light-blocking region and including a plurality of first sub-electrodes parallel to each other, wherein each of the plurality of first sub-electrodes are separated from two adjacent first sub-electrodes by a separation distance;
wherein the separation distance between two adjacent first sub-electrodes nearest to a center line of the light-blocking region is smaller than the separation distance between two adjacent first sub-electrodes nearest to an edge of the light-blocking region;
wherein the first transparent electrode further comprises a second electrode unit located inside the aperture regions and including a plurality of second sub-electrodes parallel to each other; and
wherein a pitch of the first sub-electrodes increases from the center line of the light-blocking region towards the edge of the light-blocking region and a pitch of the second sub-electrodes inside the aperture regions is uniform.

2. The display substrate of claim 1, wherein:
the plurality of first sub-electrodes are divided into two groups; and
the two groups are mirrored and symmetric to one another about the center line of the light-blocking region.

3. The display substrate of claim 1 or 2, wherein:
the light-blocking region includes one central region and at least two periphery regions that are located on opposing sides of the central region;
the separation distance between two adjacent first sub-electrodes inside the central region is uniform;
the separation distance between two adjacent first sub-electrodes inside each one of the at least two periphery regions is uniform; and
the separation distance between two adjacent first sub-electrodes inside the central region is smaller than the separation distance inside each one of the at least two periphery regions.

4. The display substrate of claim 3, wherein:
the at least two periphery regions comprise at least four periphery regions, wherein the at least four periphery regions are arranged so as to mirror symmetrically about the central region; and
the separation distance between two adjacent first sub-electrodes increases along a direction, which is parallel to a surface of the first base substrate, away from the central region.

5. The display substrate of claim 1, wherein:
the separation distance between two adjacent first sub-electrodes increases along a direction, which is parallel to a surface of the first base substrate, away from the center line of the light-blocking region.

6. The display substrate of claim 1, further comprising:
a light extraction structure arranged inside the light-blocking region, wherein the light extraction structure is configured to fetch the light transmitted by a total reflection within a backlight source.

7. The display substrate of claim 6, wherein the light extraction structure comprises light extraction gratings.

8. The display substrate of claim 7, wherein:
the light extraction gratings are arranged on the first base substrate;
the second transparent electrode is on a side of the light extraction gratings away from the first base substrate; and
the first transparent electrode is on a side of the second transparent electrode away from the first base substrate.

9. The display substrate of claim 1, wherein one of the first transparent electrode and the second transparent electrode is a pixel electrode, and the other one is a common electrode.

10. The display substrate of claim 1, wherein the pitch of the first sub-electrodes increases progressively from the center line of the light-blocking region towards the edge of the light-blocking region.

11. The display substrate of claim 10, wherein the pitch ranges between 3 μm plus half a size of a first sub-electrode among the first sub-electrodes adjacent to the center line plus half a size of a second sub-electrode neighboring the first sub-electrode, and 7 μm plus half a size of a third sub-electrode among the first sub-electrodes adjacent to the edge plus half a size of a fourth sub-electrode neighboring the third sub-electrode.

12. A display panel, comprising:
the display substrate of anyone of claims 1-11;

a color film substrate on a side of the first transparent electrode away from the second transparent electrode;

the liquid crystal layer between the display substrate and the color film substrate.

13. The display panel of claim 12, wherein:

the color film substrate comprises a second base substrate and a black matrix arranged over the second base substrate;

the black matrix defines a plurality of sub-pixel regions of the color film substrate; the sub-pixel regions of the color film substrate correspond to the sub-pixel regions of the display substrate in a one-to-one correspondence;

each sub-pixel region of the color film substrate comprises a light-blocking region and aperture regions located at the opposite sides of the light-blocking region;

the light-blocking regions of the color film substrate correspond to the light-blocking regions of the display substrate in a one-to-one correspondence;

the aperture regions of the color film substrate correspond to the aperture regions of the display substrate one-to-one; and light-blocking patterns are disposed inside the light-blocking regions of the color film substrate.

14. The display panel of claim 12, wherein: an orthographic projection of the sub-pixel regions of the color film substrate on the first substrate coincides with an orthographic projection of the sub-pixel regions of the display substrate on the first substrate.

15. The display panel of claim 12, wherein: the light-blocking patterns and the black matrix are at a same layer and made of a same material.

16. The display panel of claim 15, the light-blocking patterns cross through at least one sub-pixel region of the color film substrate.

17. The display panel of claim 12, wherein:

the light-blocking regions of the color film substrate and the aperture regions of the color film substrate are in a column direction, the light-blocking patterns in the sub-pixel regions of the color film substrate being of same row are connected; or the light-blocking regions of the color film substrate and the aperture regions of the color film substrate are in a row direction, the light-blocking patterns in the sub-pixel regions of the color film substrate being of same column are connected.

18. A display assembly comprising:

the display panel in accordance with any one of claims 12-17; and a collimated light source, wherein, the collimated light source comprises a light source and a light-guide plate, the light-guide plate comprises a light-emitting side and a light incident side arranged opposite the light-emitting side, configured to enable light reaching the light-guide plate to be transmitted through the light-incident side;

the display panel comprises a plurality of light extraction structures; and the plurality of light extraction structures are arranged on the light-emitting side of the light-guide plate so as to fetch the light transmitted by a total reflection within the light-guide plate.

19. The display assembly of claim 18, wherein the light-guide plate and the first base substrate of the display substrate have an integrated structure.

* * * * *